(12) United States Patent
Huang

(10) Patent No.: US 10,509,585 B2
(45) Date of Patent: Dec. 17, 2019

(54) DATA SYNCHRONIZATION METHOD, APPARATUS, AND SYSTEM

(71) Applicant: ALIBABA GROUP HOLDING LIMITED, George Town, Grand Cayman (KY)

(72) Inventor: Jinyan Huang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/675,138

(22) Filed: Aug. 11, 2017

(65) Prior Publication Data

US 2017/0351435 A1 Dec. 7, 2017

Related U.S. Application Data

(63) Continuation of application No. PCT/CN2016/073440, filed on Feb. 4, 2016.

(30) Foreign Application Priority Data

Feb. 13, 2015 (CN) .......................... 2015 1 0080976

(51) Int. Cl.
*G06F 3/06* (2006.01)
*G06F 16/27* (2019.01)
*G06F 16/00* (2019.01)

(52) U.S. Cl.
CPC ............ *G06F 3/065* (2013.01); *G06F 3/0619* (2013.01); *G06F 3/0683* (2013.01); *G06F 16/00* (2019.01); *G06F 16/273* (2019.01)

(58) Field of Classification Search
CPC ...... G06F 3/0683; G06F 3/065; G06F 3/0619; G06F 17/30; G06F 17/30578
(Continued)

(56) References Cited

U.S. PATENT DOCUMENTS

2004/0003007 A1  1/2004 Prall et al.
2005/0149578 A1* 7/2005 Sustman ............. G06F 11/1464
(Continued)

FOREIGN PATENT DOCUMENTS

CN  102681904 A  9/2012
CN  102945195 A  2/2013
(Continued)

OTHER PUBLICATIONS

Extended European Search Report in European Application No. 16748704.0-1871 (PCT/CN/2016073440) pursuant to Rule 62 EPC, the supplementary European search report (Art. 153(7) EPC) and the European Search Opinion, dated Oct. 30, 2017.
(Continued)

*Primary Examiner* — Hua J Song
(74) *Attorney, Agent, or Firm* — Finnegan, Henderson, Farabow, Garrett & Dunner, LLP

(57) ABSTRACT

Embodiments of the disclosure provide a data synchronization method, apparatus and system. The data synchronization method includes: receiving first modification data in primary storage; adding the first modification data to an asynchronous message queue; and sending the first modification data in the asynchronous message queue to standby storage. Embodiments of the present disclosure add modification data in primary storage to an asynchronous message queue, and send the modification data in the asynchronous message queue to standby storage by enabling one or more message sending threads, so that data synchronization between the primary storage and the standby storage is no longer restricted by the resources of the primary storage. The method reduces the time delay between the primary storage and the standby storage during data synchronization by sending data via multiple threads.

13 Claims, 7 Drawing Sheets

(58) Field of Classification Search
USPC .......................................................... 711/165
See application file for complete search history.

(56) References Cited

U.S. PATENT DOCUMENTS

| | | | |
|---|---|---|---|
| 2007/0198700 A1 | 8/2007 | Vivian et al. | |
| 2008/0115128 A1 | 5/2008 | Achanta et al. | |
| 2013/0332416 A1 | 12/2013 | Yudenfriend et al. | |
| 2017/0085515 A1* | 3/2017 | Klemm | ................... H04L 51/32 |

FOREIGN PATENT DOCUMENTS

| | | | |
|---|---|---|---|
| CN | 103500229 A | 1/2014 | |
| CN | 103885986 A | 6/2014 | |
| CN | 104021200 A | 9/2014 | |
| EP | 2790112 A1 | 3/2013 | |
| JP | 2002014861 A | 1/2002 | |
| JP | 2004038928 A | 2/2004 | |
| JP | 2005531856 A | 10/2005 | |
| JP | 2007511008 A | 4/2007 | |
| JP | 2011070636 A | 4/2011 | |
| WO | WO 2005048124 A2 | 5/2005 | |

OTHER PUBLICATIONS

International Preliminary Report issued in related International Application No. PCT/CN2016/073440, dated Aug. 15, 2017 (4 pgs.).

International Search Report and Written Opinion issued in related International Application. No. PCT/CN2016/073440, dated May 4, 2016 (4 pgs.).

First Office Action issued by The State Intellectual Property Office of People's Republic of China in related Chinese Application No. CN 201510080976.9, dated Jan. 22, 2019.

Japanese Patent Office, Notice of Reasons for Refusal issued in corresponding Japanese Application No. 2017-542457, dated Aug. 26, 2019 (4 pages).

* cited by examiner

DATA SYNCHRONIZATION METHOD, APPARATUS, AND SYSTEM

CROSS REFERENCE TO RELATED APPLICATION

The disclosure claims the benefits of priority to International Application No. PCT/CN2016/073440, filed on Feb. 4, 2016, which claims the benefits of priority to Chinese Application No. 201510080976.9, filed Feb. 13, 2015, both of which are incorporated herein in their entireties.

TECHNICAL FIELD

The present disclosure relates to the technical field of data processing, and in particular, to a data synchronization method, a data synchronization apparatus and a data synchronization system.

BACKGROUND

Real-time backup of data is needed in software systems that require high availability and high data security. At present, there are mainly two solutions, i.e., synchronous writing of a primary storage to a backup storage, and asynchronous writing of a primary storage to a backup storage.

Among others, Oracle Data Guard is a database solution with high availability. This solution ensures the data synchronization between primary storage and standby storage through log synchronization, and can achieve fast switching and disaster recovery of databases. Users can implement synchronization between primary data and standby data with very little impact on the primary storage database, and the data difference between the primary storage and standby storage is merely the on-line log part. Therefore, the solution is used by many enterprises as a data disaster recovery solution. The synchronization method for primary and standby data can be configured as two types, including synchronously updating a standby storage database and asynchronously updating a standby storage database.

However, the time delay between the primary storage and the standby storage in this solution is relatively large, and thus the solution cannot be applied to scenarios that have a very high demand for real-time performance.

Therefore, one technical problem that those skilled in the art urgently need to solve is how to reduce the time delay between the primary storage and the standby storage during data synchronization.

SUMMARY

The technical problem to be solved by embodiments of the present disclosure is to provide a data synchronization method that can reduce the time delay between primary storage and standby storage during data synchronization.

Correspondingly, the embodiments of the present disclosure further provide a data synchronization apparatus and a data synchronization system, so as to ensure the implementation and application of the above-mentioned method.

To solve the above-mentioned problem, a data synchronization method is disclosed in the present disclosure, comprising: receiving first modification data in primary storage; adding the first modification data to an asynchronous message queue; and sending, via a message sending thread, the first modification data in the asynchronous message queue to standby storage.

Furthermore, receiving first modification data in primary storage comprises: receiving a data snapshot of the first modification data in the primary storage.

Furthermore, the method further comprises: receiving a backlog data query request; and feeding back unsent data in the asynchronous message queue.

Furthermore, the method further comprises: receiving information, fed back by the standby storage, regarding a successful storage of the first modification data; and deleting the first modification data.

Furthermore, receiving information, fed back by the standby storage, regarding a successful storage of the first modification data comprises: receiving information, triggered and fed back by the standby storage when a feedback condition is satisfied, regarding the successful storage of the first modification data, wherein the feedback condition is that a proportion of storage units having the first modification data successfully stored to storage units of the standby storage reaches a pre-set proportion threshold.

Furthermore, sending, via a message sending thread, the first modification data in the asynchronous message queue to standby storage comprises: sending, via a message sending thread, the first modification data in the asynchronous message queue to standby memory storage, wherein a data expiration time of the standby memory storage is greater than a time delay of the primary storage synchronizing data to second standby storage.

A data synchronization apparatus is further disclosed in the present disclosure, comprising: a data receiving unit, configured to receive first modification data sent by primary storage; a data processing unit, configured to add the first modification data to an asynchronous message queue; and a data sending unit, configured to send, via a message sending thread, the first modification data in the asynchronous message queue to standby storage.

Furthermore, the data receiving unit is further configured to receive a data snapshot of the first modification data sent by the primary storage.

Furthermore, the apparatus further comprises: a request receiving unit, configured to receive a backlog data query request; and an information feedback unit, configured to feedback unsent data in the asynchronous message queue.

Furthermore, the apparatus further comprises: an information receiving unit, configured to receive information, fed back by the standby storage, regarding successful storage of the first modification data; and a data deleting unit, configured to delete the first modification data.

Furthermore, the information receiving unit is further configured to receive information, triggered and fed back by the standby storage when a feedback condition is satisfied, regarding successful storage of the first modification data, wherein the feedback condition is that the proportion of storage units having the first modification data successfully stored to all storage units of the standby storage reaches a pre-set proportion threshold.

Furthermore, the data sending unit is further configured to send, via a message sending thread, the first modification data in the asynchronous message queue to standby memory storage, wherein a data expiration time of the standby memory storage is greater than a time delay of the primary storage synchronizing data to second standby storage.

A data synchronization system is further disclosed in the present disclosure, comprising primary storage, an asynchronous message queue system, standby memory storage and second standby storage, the asynchronous message queue system, configured to receive first modification data sent by the primary storage, add the first modification data to an asynchronous message queue, and send, via a message sending thread, the first modification data in the asynchronous message queue to the standby memory storage; and the second standby storage, configured to receive and store synchronous data of the primary storage, wherein a data expiration time of the standby memory storage is greater than a time delay of the primary storage synchronizing data to the second standby storage.

Compared with the prior art, the embodiments of the present disclosure have the following advantages: in the embodiments of the present disclosure, modification data in primary storage is added to an asynchronous message queue, and the modification data in the asynchronous message queue is sent to standby storage by enabling one or more message sending threads, so that data synchronization between the primary storage and the standby storage is no longer restricted by the resources of the primary storage. The method reduces the time delay between the primary storage and the standby storage during data synchronization by sending data via multiple threads.

DETAILED DESCRIPTION

To make the foregoing objectives, characteristics, and advantages of the present disclosure clearer and more comprehensible, the present disclosure is further described in detail below in conjunction with the accompanying drawings and specific embodiments.

Figure 1:
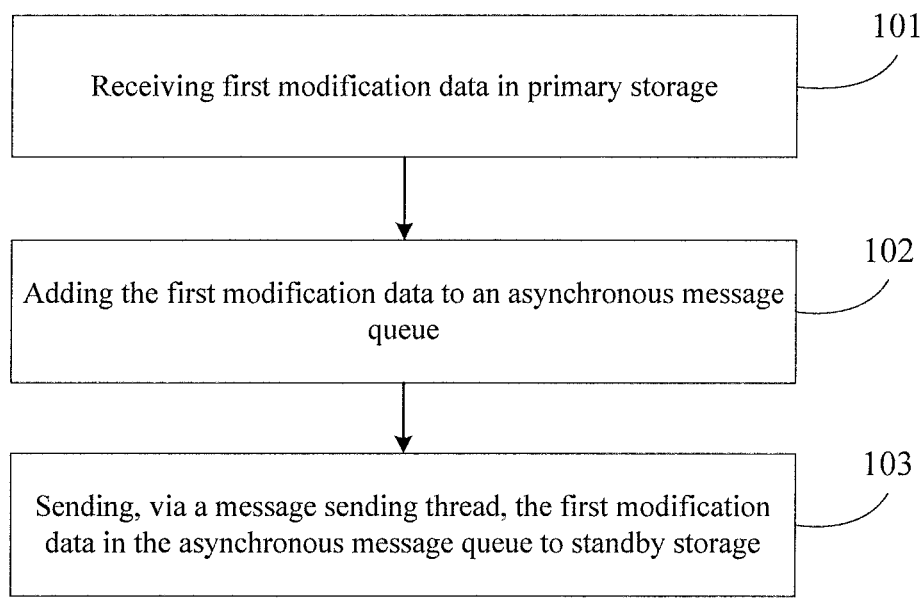
FIG. 1 is a flow chart of an exemplary data synchronization method according to embodiments of the present disclosure.

With reference to FIG. 1, a flow chart of an exemplary data synchronization method according to embodiments of the present disclosure is shown, wherein the method may comprise the following steps 101-103.

In step 101, first modification data in primary storage can be received at a data synchronization apparatus. In the embodiments of the present disclosure, a data synchronization apparatus may be an apparatus that is located between a primary storage and a standby storage, and that independently implements synchronous data processing and sending.

When data changes (e.g., data modification or data update) occur in the primary storage, a service system may read modification data in the primary storage and record the same as first modification data, and then send the first modification data to the data synchronization apparatus.

For example, the service system may send a data snapshot of the first modification data to the data synchronization apparatus. The data modification in the primary storage and the sending of the data snapshot are accomplished in the same transaction, so as to ensure the atomicity of the data modification on the primary storage and the sending of the data snapshot.

In step 102, the first modification data can be added to an asynchronous message queue.

In these embodiments, after receiving the first modification data, the data synchronization apparatus adds the first modification data to an asynchronous message queue. If a snapshot of the first modification data is received, then the snapshot is added to the asynchronous message queue. During data synchronization, data in the asynchronous message queue is read for synchronization. After the data synchronization apparatus adds the first modification data to the asynchronous message queue, information regarding successful data loading may be further returned to the service system.

The asynchronous message queue is not only used for placing data that needs to be synchronized, but may also provide a query interface externally, so as to provide a query about data sending conditions in the asynchronous message queue.

In step 103, sending, the first modification data in the asynchronous message queue can be sent to standby storage via a message sending.

During data synchronization, the data synchronization apparatus may send, via a message sending thread, the first modification data in the asynchronous message queue to the standby storage, wherein the data synchronization apparatus may be deployed as a cluster system. In this way, the cluster system may have an updated network link compared with a single physical database, and may enable more message sending threads. And when all the modification data in the asynchronous message queue is sent via multiple message sending threads, a time delay of off-site data synchronization may even reach the limit of a single network communication, and thus data synchronization between the primary storage and the standby storage is not affected by the resources of the primary storage.

The standby storage may be Oracle standby storage, and may also be a combination of storage units of different types, such as a combination of a memory and Oracle standby storage.

In the embodiments of the present disclosure, modification data in the primary storage is added to an asynchronous message queue, and the modification data in the asynchronous message queue is sent to the standby storage by enabling one or more message sending threads, so that data synchronization between the primary storage and the standby storages is no longer restricted by the resources of the primary storage. The method reduces the time delay between the primary storage and the standby storage during data synchronization by sending data via multiple threads.

Moreover, in the embodiments of the present disclosure, the data update on the primary storage and the sending of a data snapshot message are processed synchronously, and the only unstable factor introduced is the asynchronous message queue. However, with regard to the data synchronization method in these embodiments, in the aspect of application system, data synchronization between primary and standby storages can be rapidly implemented in a cluster manner. And in the aspect of the database, a database may be allocated randomly and a physical database of a single asynchronous message queue may be automatically eliminated after crashing, without affecting the availability, because the data snapshot message has no service meaning. In the aspect of service throughput, since only synchronous calling of the sending of the data snapshot message is added to the service system, the service logic is quite simple. The main problem is network consumption. And generally, the sending only takes three milliseconds, which has very little impact on the throughput and the time delay of the service system. Therefore, the data synchronization method hardly affects on-line service processing, and has little impact on the stability, time delay, throughput, etc. of the entire service.

Figure 2:
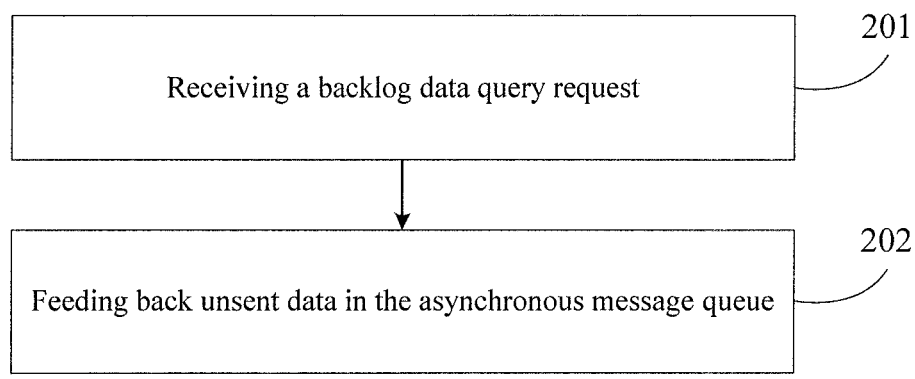
FIG. 2 is a flow chart of an exemplary method for providing data query according to embodiments of the present disclosure.

In embodiments of the present disclosure, as shown in FIG. 2, the method may further comprise the following steps 201 and 202.

In step 201, a backlog data query request can be received at a data synchronization apparatus.

The data synchronization apparatus may provide a query interface. In some embodiments, a query request, from the service system, for backlog data in the asynchronous message queue is received via the interface.

In step 202, unsent data in the asynchronous message queue can be fed back.

The data synchronization apparatus queries data, which has not been delivered, in the asynchronous message queue, and feeds back the data or information related to the data to a query party, such as the service system.

Steps 201-202 may be executed after the preceding step 102, and the step order among steps 201-202 and steps 101-103 may also be adjusted according to the requirements, which are not limited herein.

In these embodiments, if the modification data in the primary storage has already been successfully submitted to the service system, then the data snapshot message is also already sent to the asynchronous message queue. And if there is no backlog data in the asynchronous message queue, then the modification data in the primary storage has certainly been successfully written into the standby storage.

The data synchronization apparatus externally provides a query for backlog data in the asynchronous message queue. Thus, the data synchronization apparatus can distinguish which modification data is not synchronized to the standby storage and be able to accurately detect the data difference between the primary storage and the standby storage. Moreover, unreliable data corresponding to the modification data can be detected in the standby storage, and when the primary storage crashes, an extremely small volume of abnormal data can be rapidly eliminated, enabling normal data in the standby storage to provide a normal update service.

Figure 3:
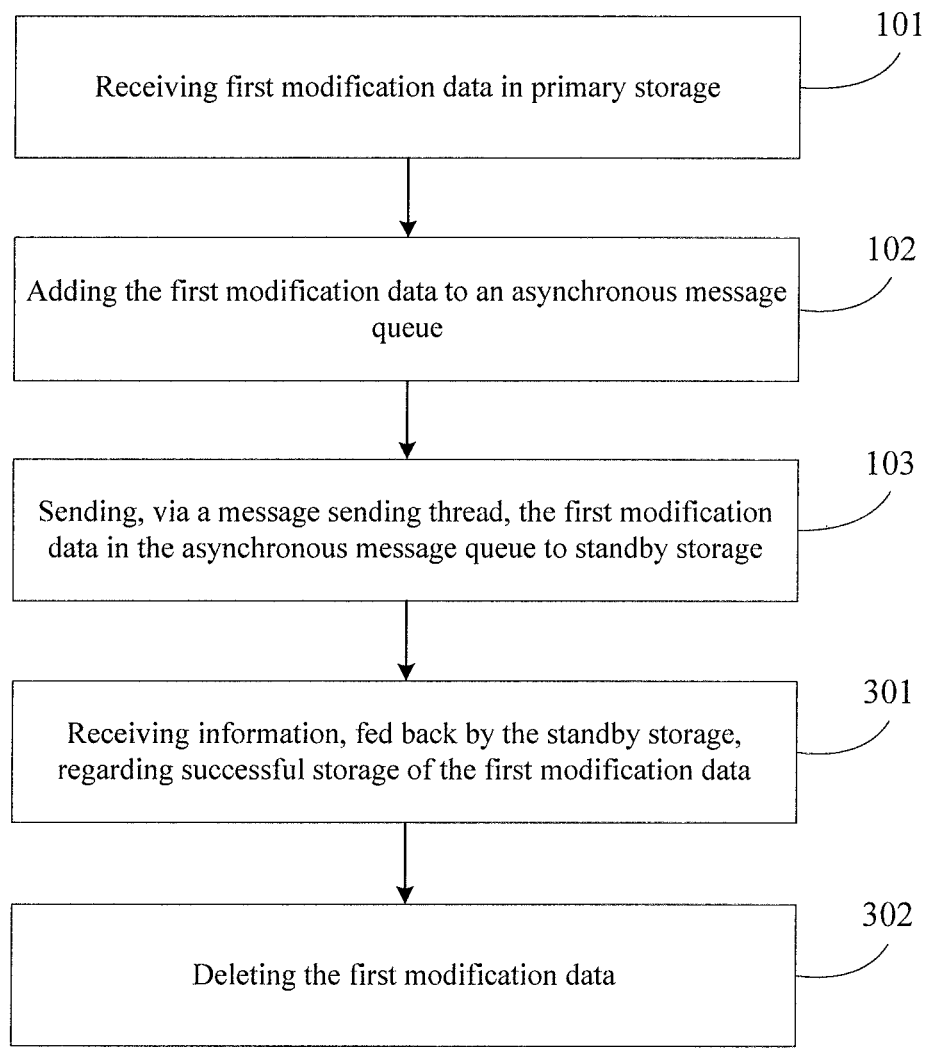
FIG. 3 is a flow chart of another exemplary data synchronization method according to embodiments of the present disclosure.

In embodiments of the present disclosure, as shown in FIG. 3, the method may further comprise steps 301 and 302.

In step 301, information, fed back by the standby storage, regarding successful storage of the first modification data can be received.

After the standby storage receives the first modification data and the first modification data is successfully stored in the standby storage, the standby storage may feed back information regarding the successful storage of the first modification data to the data synchronization apparatus.

Consistent with the disclosure, the standby storage may then trigger and feed back information regarding the successful storage of the first modification data when a pre-set feedback condition is satisfied.

For example, if the standby storage comprises multiple storage units that are the same and independent from each other and each of the storage units stores synchronous data respectively, then the feedback condition may be that the proportion of storage units having the first modification data successfully stored to all storage units of the standby storage reaches a pre-set proportion threshold. For example, the proportion threshold may be 50%. That is also to say, when the storage of the first modification data takes half of the standby storage, the standby storage may feed back information regarding the successful storage of the first modification data.

For scenarios where the requirements are extremely strict and data in the standby storage is not used under normal conditions, it may be configured that information regarding the successful storage is fed back only when the writing into all the storage units succeeds.

In step 302, the first modification data can be deleted.

The data synchronization apparatus will not instantly delete the first modification data after sending the first modification data in the asynchronous message queue to the standby storage. The data synchronization apparatus may mark and store the first modification data, so as to indicate that the sending of the first modification data has been completed, and then delete the first modification data after information regarding the successful storage of the first modification data is received.

In another embodiment of the present disclosure, there may be two pieces of standby storage, comprising standby memory storage and second standby storage, wherein the second standby storage may be Oracle standby storage.

The data synchronization apparatus sending the first modification data to the standby storage may be sending, via a message sending thread, the first modification data in the asynchronous message queue to the standby memory storage. The read/write speed of a memory is fast, and the fast writing of modification data may be achieved by sending the modification data to the standby memory storage. However, the standby memory storage is not suitable for storing a great volume of data due to its limited storage space, and a data expiration time may be set for the standby memory storage, with expired data being directly deleted.

Based on this, in order to facilitate storage and query of a great volume of data, the primary storage may completely send, in a synchronous or asynchronous storage manner, the data in the primary storage to the second standby storage for storage. A data expiration time of the standby memory storage is set to be far greater than a time delay of the primary storage synchronizing data to the second standby storage. In this way, modification data may be rapidly written in by the standby memory storage, and only modification data within a recent time period needs to be reserved. In addition, all the synchronous data may be read by the second standby storage. When the data expiration time of the standby memory storage is being set, the time delay between the primary storage and the second standby storage during data synchronization is determined, and there are many ways to obtain/determine the time delay. For example, since the primary storage sequentially synchronizes data to the second standby storage, the time delay of the primary storage synchronizing the data to the second standby storage may be monitored in real time by writing a time stamp on data of the primary storage and then querying, in the second standby storage, the time when the data is received.

With regard to different application scenarios, there are different ways to use the standby storage in the present disclosure. For the query of data that has changed in a recent time period, it only needs to directly query the standby memory storage, such as risk inspection in a financial system. And for disaster recovery, it can exclude the backlog data in the asynchronous message queue, wherein this part of data does not provide services temporarily, and then obtain the latest data by comparing the standby memory storage with the second standby storage. A part of data, which is not completely successfully stored in the standby memory storage, is eliminated from the latest data. The latest data is certainly consistent with the data in the primary storage, and the latest data may directly provide a modification service externally. Such way of use is a solution for scenarios, such as high availability, computer room level disaster recovery, remote disaster recovery, and the like, of the financial system.

It should be noted that, for clarity, the methods according to embodiments are represented as a series of action combinations. However, it is appreciated that the embodiments of the present disclosure are not limited to the order of the described actions because according to the embodiments of the present disclosure, some steps may adopt other orders or may occur simultaneously. In addition, it is also appreciated that the embodiments described in the specification are all preferred embodiments and that involved actions are not necessarily required for the embodiments of the present disclosure.

Figure 4:
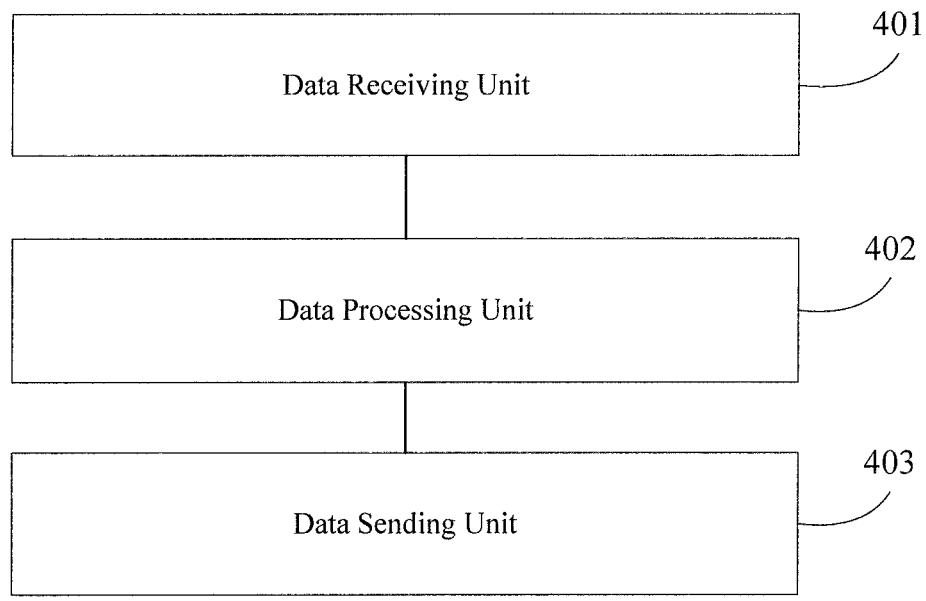
FIG. 4 is an exemplary structural block diagram of a data synchronization apparatus according to embodiments of the present disclosure.

With reference to FIG. 4, an exemplary structural block diagram of a data synchronization apparatus according to embodiments of the present disclosure is shown, wherein the apparatus may comprise the following units: a data receiving unit 401, configured to receive first modification data sent by primary storage; a data processing unit 402, configured to add the first modification data to an asynchronous message queue; and a data sending unit 403, configured to send, via a message sending thread, the first modification data in the asynchronous message queue to standby storage.

In general, the units used herein (and any corresponding sub-units), can be a packaged functional hardware unit designed for use with other components (e.g., portions of an integrated circuit) or a part of a program (stored on a computer readable medium) that performs a particular function of related functions. The units can have entry and exit points and can be written in a programming language, such as, for example, Java, Lua, C or C++. A software unit can be compiled and linked into an executable program, installed in a dynamic link library, or written in an interpreted programming language such as, for example, BASIC, Perl, or Python. It will be appreciated that software units can be callable from other units or from themselves, and/or can be invoked in response to detected events or interrupts. Software units configured for execution on computing devices can be provided on a computer readable medium, such as a compact disc, digital video disc, flash drive, magnetic disc, or any other non-transitory medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedding in firmware, such as an EPROM. It will be further appreciated that hardware units can be comprised of connected logic units, such as gates and flip-flops, and/or can be comprised of programmable units, such as programmable gate arrays or processors. The units or computing device functionality described herein are preferably implemented as software modules, but can be represented in hardware or firmware. Generally, the units described herein refer to logical units that can be combined with other units or divided into sub-units despite their physical organization or storage.

In the embodiments of the present disclosure, modification data in primary storage is added, by means of the above-mentioned units, to an asynchronous message queue, and the modification data in the asynchronous message queue is sent to standby storage by enabling one or more message sending threads. Therefore, data synchronization between the primary storage and the standby storage is no longer restricted by the resources of the primary storage. The apparatus reduces the time delay between the primary storage and the standby storage during data synchronization by sending data via multiple threads.

Moreover, in the embodiments of the present disclosure, the data update on the primary storage and the sending of a data snapshot message are processed synchronously, and the only unstable factor introduced is the asynchronous message queue. However, with regard to the data synchronization apparatus in these embodiments, in the aspect of application system, data synchronization between primary and standby storage can be rapidly implemented in a cluster manner. And in the aspect of database, the data snapshot message has no service meaning, for which a database may be allocated randomly, and a physical database of a single asynchronous message queue may be automatically eliminated after crashing, without affecting the availability. In the aspect of service throughput, since only synchronous calling of the sending of the data snapshot message is added to the service system, the service logic is quite simple. But the main problem is network consumption. Generally, the sending only takes three milliseconds, which has very little impact on the throughput and the time delay of the service system. Therefore, the data synchronization apparatus hardly affects on-line service processing, and has little impact on the stability, time delay, throughput, etc. of the entire service.

In embodiments of the present disclosure, the data receiving unit 401 may be configured to receive a data snapshot of the first modification data sent by the primary storage.

Figure 5:
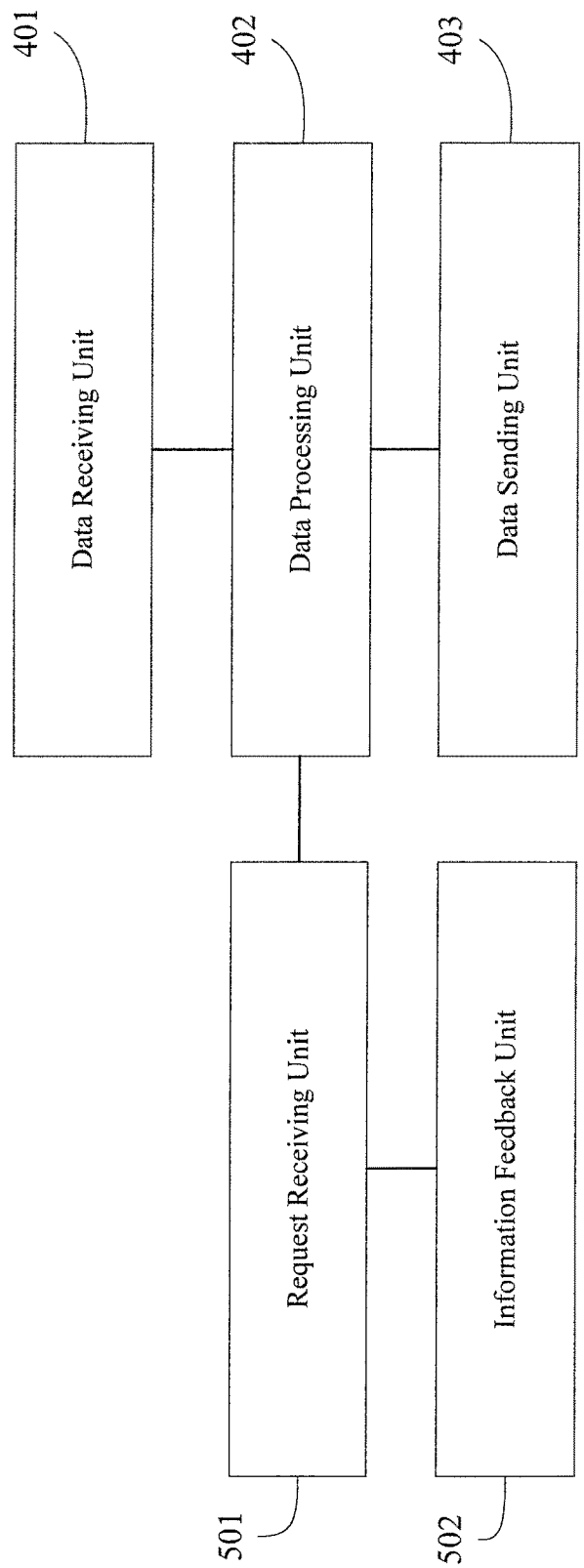
FIG. 5 is an exemplary structural block diagram of another data synchronization apparatus according to embodiments of the present disclosure.

In embodiments of the present disclosure, as shown in FIG. 5, the apparatus further comprises: a request receiving unit 501, configured to receive a backlog data query request; and an information feedback unit 502, configured to feed back unsent data in the asynchronous message queue.

The data synchronization apparatus externally provides a query for backlog data in the asynchronous message queue. Therefore, which modification data is not synchronized to the standby storage can be distinguished. Accordingly, unreliable data corresponding to the modification data in the standby storage can be detected, and when the primary storage crashes, an extremely small volume of abnormal data can be rapidly eliminated, enabling normal data in the standby storage to provide a normal update service.

Figure 6:
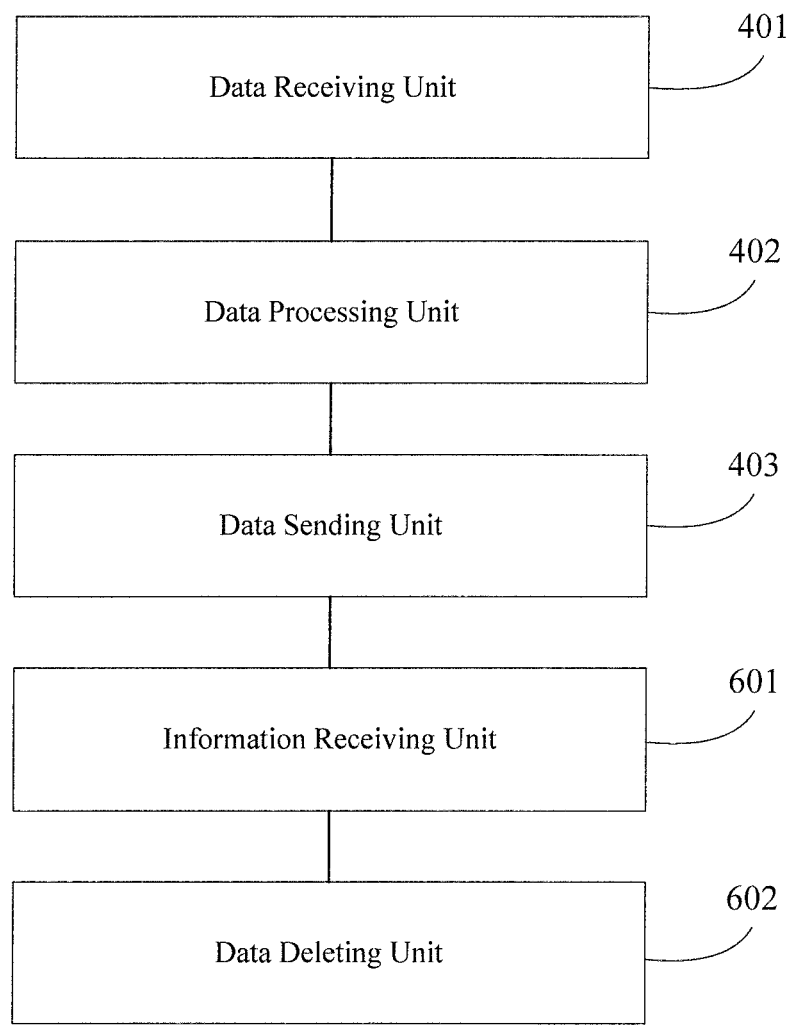
FIG. 6 is an exemplary structural block diagram of another data synchronization apparatus according to embodiments of the present disclosure.

In embodiments of the present disclosure, as shown in FIG. 6, the apparatus can further comprise: an information receiving unit 601, configured to receive information, fed back by the standby storage, regarding successful storage of the first modification data; and a data deleting unit 602, configured to delete the first modification data.

The information receiving unit 601 may be configured to receive information, triggered and fed back by the standby storage when a feedback condition is satisfied, regarding successful storage of the first modification data, wherein the feedback condition is that the proportion of storage units having the first modification data successfully stored to all storage units of the standby storage reaches a pre-set proportion threshold.

In some embodiments, the data sending unit 403 may be configured to send, via a message sending thread, the first modification data in the asynchronous message queue to standby memory storage, wherein a data expiration time of the standby memory storage is greater than a time delay of the primary storage synchronizing data to second standby storage.

The embodiments of the present disclosure further disclose an electronic device, comprising a memory, a transceiver and a processor.

The processor, the transceiver and the memory are connected to each other by a bus, and the bus may be an ISA bus, a PCI bus, an EISA bus, or the like. The bus may be categorized into an address bus, a data bus, a control bus, and the like.

The memory is used to store a segment of program, and for example, the program may comprise program codes, wherein the program codes comprise a computer operating instruction. The memory may comprise a high-speed RAM, or may further comprise a non-volatile memory, such as at least one disk memory.

The transceiver is used to receive first modification data in primary storage, and send, via a message sending thread, the first modification data in an asynchronous message queue to standby storage.

The processor is used to read program codes in the memory, and perform the following step:

adding the first modification data to an asynchronous message queue.

Figure 7:
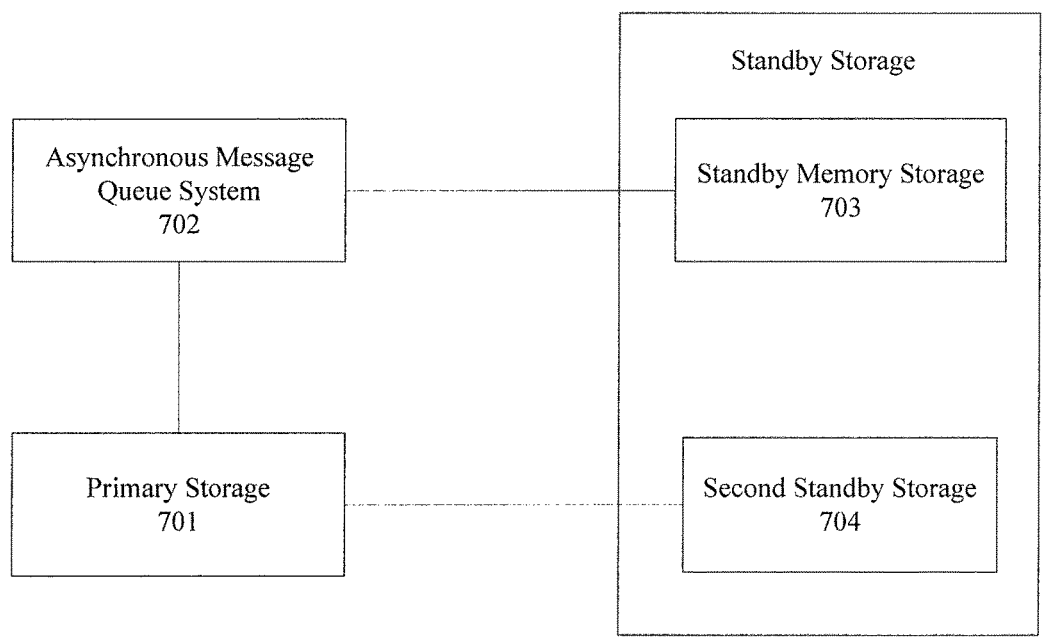
FIG. 7 is an exemplary structural block diagram of a data synchronization system according to embodiments of the present disclosure.

With reference to FIG. 7, a structural block diagram of an exemplary data synchronization system according to embodiments of the present disclosure is shown, wherein the system may comprise primary storage 701, an asynchronous message queue system 702 and standby storage, wherein the standby storage comprises standby memory storage 703 and second standby storage 704.

The asynchronous message queue system 702 is configured to receive first modification data sent by the primary storage 701, add the first modification data to an asynchronous message queue, and send, via a message sending thread, the first modification data in the asynchronous message queue to the standby memory storage 703; and the second standby storage 704 is configured to receive and store synchronous data of the primary storage 701, wherein a data expiration time of the standby memory storage 703 is greater than a time delay of the primary storage 701 synchronizing data to the second standby storage 704.

The second standby storage 704 may be Oracle standby storage.

Embodiments for an apparatus are similar to embodiments for a method, and therefore are described briefly. For related parts, reference may be made to partial description in the embodiments for the method.

Various embodiments in this description are all described in a progressive manner, each embodiment focuses on a difference from other embodiments, and for the same or similar parts between the embodiments, reference may be made to each other.

It should be appreciated that the embodiments of the present disclosure may be provided as a method, an apparatus, or a computer program product. Thus, the embodiments of the present disclosure may adopt full hardware embodiments, full software embodiments, or embodiments which combine software and hardware. Moreover, the embodiments of the present disclosure may use a form of a computer program product that is implemented on one or more computer-usable storage media (including, but not limited to, a disk memory, a CD-ROM, an optical memory, and the like) that include computer-usable program codes.

In a typical configuration, the computer device comprises one or more processors (CPUs), an input/output interface, a network interface and a memory. The memory may comprise a non-permanent memory, a random access memory (RAM) and/or a non-volatile memory (such as a read-only memory (ROM) or flash memory (flash RAM)) and so on in computer-readable media. The memory is an example of the computer-readable media. The computer-readable media comprises permanent and non-permanent, removable and non-removable media, and may realize information storage with any method or technology. The information may be a computer-readable instruction, data structure, program module or other data. The examples of computer storage media include, but are not limited to, a phase change memory (PRAM), static random access memory (SRAM), dynamic random access memory (DRAM), other types of random access memories (RAMs), read-only memory (ROM), electrically erasable programmable read-only memory (EEPROM), flash memory or other memory technologies, compact disk read-only memory (CD-ROM), digital versatile disc (DVD) or other optical storage, magnetic cassette tape, magnetic tape and magnetic disk storage or other magnetic storage devices or any other non-transmission media that can be used to store information that can be accessed by a computing device. According to the definition herein, the computer-readable media does not include transitory media, such as modulated data signals and carriers.

The embodiments of the present disclosure are described with reference to the flow charts and/or block diagrams according to the method, terminal device (system) and computer program product in the embodiments of the present disclosure. It should be understood that each flow and/or block in the flow charts and/or block diagrams and any combination of the flows and/or blocks in the flow charts and/or block diagrams may be implemented with computer program instructions. These computer program instructions may be provided for a general-purpose computer, a dedicated computer, an embedded processor, or a processor of other programmable data processing terminal devices to generate a machine, so that the instructions executed by a computer or a processor of other programmable data processing terminal devices generate an apparatus for implementing a specified function in one or more flows in the flow charts and/or in one or more blocks in the block diagrams.

These computer program instructions may also be stored in a computer-readable memory, which may guide a computer or other programmable data processing terminal devices to operate in a specific manner, so that the instructions stored in the computer-readable memory generate an article of manufacture including an instruction means which can implement a specified function in one or more flows in the flow charts and/or in one or more blocks in the block diagrams.

These computer program instructions may also be loaded onto a computer or other programmable data processing terminal devices, so that a series of operations and steps are performed on the computer or other programmable terminal devices, to generate computer-implemented processing. Therefore, the instructions executed on the computer or other programmable terminal devices provide steps for implementing a specified function in one or more flows in the flow charts and/or in one or more blocks in the block diagrams.

Although embodiments of the embodiments of the present disclosure have been described, those skilled in the art could make additional changes and modifications to these embodiments once they learn the basic inventive concept. Therefore, the appended claims are intended to be construed as covering the embodiments and all changes and modifications falling within the scope of the embodiments of the present disclosure.

Finally, it should also be noted that in this context, relational terms such as first and second are used only to differentiate an entity or operation from another entity or operation, and do not necessarily require or imply that any such actual relationship or sequence exists between these entities or operations. Moreover, the term "comprise", "include", or any other variant thereof is intended to cover a non-exclusive inclusion, so that a process, a method, an article, or a terminal device that comprises a list of elements not only comprises those elements but also comprises other elements which are not expressly listed, or further comprises elements inherent to such process, method, article, or terminal device. If there are no more limitations, elements defined by "comprising a . . . " do not exclude the situation where other identical elements exist in processes, methods, articles, or terminal devices including the elements.

The data synchronization method and the data synchronization apparatus provided by the present disclosure are described above in detail. Although the principles and implementation manners of the present disclosure are described by using specific embodiments in this context, the foregoing descriptions of the embodiments are only intended to help understanding the method of the present disclosure and core idea thereof. In addition, with regard to the specific implementations and the application scope, modifications may be made by those of ordinary skill in the art according to the idea of the present disclosure. In conclusion, the content of this description shall not be construed as a limitation to the present disclosure.

What is claimed is:

1. A data synchronization method, comprising:
   receiving, by a data synchronization apparatus, first modification data sent by a primary storage;
   adding the first modification data to an asynchronous message queue of the data synchronization apparatus;
   sending, via a message sending thread, the first modification data in the asynchronous message queue to a standby storage;
   receiving, from the standby storage, information indicating a successful storage of the first modification data, the information is fed back by the standby storage when a proportion of storage units having the first modification data successfully stored to all storage units of the standby storage reaches a pre-set proportion threshold; and
   in response to receiving the information, deleting the first modification data.

2. The method according to claim 1, wherein receiving, by the data synchronization apparatus, the first modification data sent by the primary storage further comprises:
   receiving a data snapshot of the first modification data sent by the primary storage.

3. The method according to claim 1, further comprising:
   receiving, by the data synchronization apparatus, a backlog data query request for backlog data in the asynchronous message queue; and
   feeding back the backlog data in the asynchronous message queue to a query art.

4. The method according to claim 1, wherein sending, via a message sending thread, the first modification data in the asynchronous message queue to the standby storage further comprises:
   sending, via a message sending thread, the first modification data in the asynchronous message queue to a standby memory storage, wherein a data expiration time of the standby memory storage is greater than a time delay of the primary storage synchronizing data to a second standby storage, the data expiration time of the standby memory storage indicates a time by which the first modification data stored in the standby memory storage is deleted.

5. A data synchronization apparatus, comprising:
   a memory storing a set of instructions; and
   a processor configured to execute the set of instructions to cause the data synchronization apparatus to perform:
   receiving first modification data sent by a primary storage;
   adding the first modification data to an asynchronous message queue of the data synchronization apparatus;
   sending, via a message sending thread, the first modification data in the asynchronous message queue to a standby storage;
   receiving, from the standby storage, information indicating a successful storage of the first modification data, the information is fed back by the standby storage when a proportion of storage units having the first modification data successfully stored to all storage units of the standby storage reaches a pre-set proportion threshold; and
   deleting the first modification data in response to receiving the information.

6. The apparatus according to claim 5, wherein the processor is further configured to execute the set of instructions to cause the data synchronization apparatus to perform:
   receiving a data snapshot of the first modification data sent by the primary storage.

7. The apparatus according to claim 5, wherein the processor is further configured to execute the set of instructions to cause the data synchronization apparatus to perform:
   receiving a backlog data query request for backlog data in the asynchronous message queue; and
   feedbacking the backlog data in the asynchronous message queue to a query party.

8. The apparatus according to claim 5, wherein the processor is further configured to execute the set of instructions to cause the data synchronization apparatus to perform:
   sending, via a message sending thread, the first modification data in the asynchronous message queue to standby memory storage, wherein a data expiration time of the standby memory storage is greater than a time delay of the primary storage synchronizing data to second standby storage.

9. A data synchronization system, comprising:
   a primary storage;
   an asynchronous message queue system; and
   a standby storage comprising a standby memory storage and a second standby storage,
   wherein the asynchronous message queue system is configured to:
      receive first modification data sent by the primary storage;
      add the first modification data to an asynchronous message queue;
      send, via a message sending thread, the first modification data in the asynchronous message queue to the standby memory storage;

receive, from the standby memory storage, information indicating a successful storage of the first modification data, the information is fed back by the standby memory storage when a proportion of storage units having the first modification data successfully stored to all storage units of the standby storage reaches a pre-set proportion threshold; and in response to receiving the information, delete the first modification data, and wherein the second standby storage is configured to receive and store synchronous data of the primary storage.

10. A non-transitory computer readable medium that stores a set of instructions that is executable by at least one processor of a data synchronization device to cause the data synchronization device to perform a data synchronization method, the method comprising:

receiving, by the data synchronization device, first modification data sent by primary storage;

adding the first modification data to an asynchronous message queue of the data synchronization device;

sending, via a message sending thread, the first modification data in the asynchronous message queue to a standby storage;

receiving, from the standby storage, information indicating a successful storage of the first modification data, the information is fed back by the standby storage when a proportion of storage units having the first modification data successfully stored to all storage units of the standby storage reaches a pre-set proportion threshold; and in response to receiving the information, deleting the first modification data.

11. The non-transitory computer readable medium according to claim 10, wherein receiving, by the data synchronization device, first modification data sent by the primary storage further comprises:

receiving, by the data synchronization device, a data snapshot of the first modification data sent by the primary storage.

12. The non-transitory computer readable medium according to claim 10, wherein the set of instructions is executable by the at least one processor of the data synchronization device to cause the data synchronization device to further perform:

receiving, by the data synchronization device, a backlog data query request for backlog data in the asynchronous message queue; and feeding back the backlog data in the asynchronous message queue to a query party.

13. The non-transitory computer readable medium according to claim 10, wherein sending, via a message sending thread, the first modification data in the asynchronous message queue to standby storage further comprises:

sending, via a message sending thread, the first modification data in the asynchronous message queue to standby memory storage, wherein a data expiration time of the standby memory storage is greater than a time delay of the primary storage synchronizing data to second standby storage.

* * * * *